United States Patent [19]
Furuya et al.

[11] Patent Number: 5,609,552
[45] Date of Patent: Mar. 11, 1997

[54] LOCKUP CLUTCH CONTROL RESPONSIVE TO DEGRADED ATF FLUID CONDITION

[75] Inventors: Masayuki Furuya, Sagamihara; Hirofumi Michioka, Fujisawa, both of Japan

[73] Assignee: Nissan Motor Co., Ltd., Yokohama, Japan

[21] Appl. No.: 378,265

[22] Filed: Jan. 26, 1995

[30] Foreign Application Priority Data

Jan. 31, 1994 [JP] Japan ................................. 6-009521
Jan. 31, 1994 [JP] Japan ................................. 6-009522

[51] Int. Cl.$^6$ ......................... F16H 61/14; F16H 47/06
[52] U.S. Cl. .......................... 477/174; 477/175; 477/176; 477/906
[58] Field of Search ................ 192/3.31; 477/97, 477/98, 168, 169, 174, 175, 176, 906

[56] References Cited

U.S. PATENT DOCUMENTS

| | | | |
|---|---|---|---|
| 4,969,099 | 11/1990 | Iwatsuki et al. | 477/906 X |
| 5,016,174 | 5/1991 | Ito et al. | 477/906 X |
| 5,046,175 | 9/1991 | Lentz et al. | 477/906 X |
| 5,425,687 | 6/1995 | Taga et al. | 477/97 X |
| 5,475,590 | 12/1995 | Palansky et al. | 192/3.31 X |

FOREIGN PATENT DOCUMENTS

| | | | |
|---|---|---|---|
| 4121530 | 1/1992 | Germany | 477/906 |
| 5-180330 | 7/1993 | Japan | 477/176 |
| 5-172237 | 7/1993 | Japan | 477/906 |

*Primary Examiner*—Khoi Q. Ta
*Attorney, Agent, or Firm*—Foley & Lardner

[57] ABSTRACT

A method and apparatus for use with an automotive vehicle having an automatic transmission operable with a working fluid. The automatic transmission is coupled to an engine through a torque converter operable in a lockup mode where a mechanical connection is completed between the engine and the automatic transmission in response to a lockup command signal. A degree to which the working fluid is degraded is detected while the torque converter is operating in response to the lockup command signal which is produced when the vehicle speed exceeds a reference value. When the detected degree exceeds a predetermined value, the reference vehicle speed value is increased.

54 Claims, 5 Drawing Sheets

| SELECTED FACTOR | | 1~8 | 0 |
|---|---|---|---|
| D RANGE | 3RD | TG2 | TG1 |
| | NOT 3RD | TG1 | TG1 |
| NOT D RANGE | | TG1 | TG1 |

| SELECTED FACTOR | | 1~8 | 0 |
|---|---|---|---|
| D RANGE | 1SR, 2ND | T11 | T11 |
| | 3RD, 4TH | T12 | T11 |
| NOT D RANGE | | T11 | T11 |

LOCKUP CLUTCH CONTROL RESPONSIVE TO DEGRADED ATF FLUID CONDITION

BACKGROUND OF THE INVENTION

This invention relates to an automatic transmission lockup control apparatus for use with an automotive vehicle including an engine coupled to an automatic transmission through a torque converter operable in a lockup mode where a mechanical connection is completed between its input and output members.

A lockup command is produced to operate the torque converter in the lockup mode under an opera ting condition specified as a function of vehicle speed and engine load (as inferred from throttle valve position). It is the current practice to improve fuel economy by producing the lockup command at less vehicle speed and less throttle valve position. Normally, the vehicle speed is set at a minimum value possible to supply the working oil from the oil pump in an amount sufficient to provide a complete lockup condition in the torque converter. When the working oil is degraded, however, its viscosity decreases to cause working oil leakage through the lockup control valve. As a result, a great degree of slippage occurs in the torque converter to cause wear of the lockup clutch and reduction in the efficiency of drive transmission of the torque converter resulting in fuel economy loss.

SUMMARY OF THE INVENTION

It is a main object of the invention to provide an improved lockup control method and apparatus which can retain good lockup control even when the working oil is degraded.

There is provided, in accordance with the invention, a lockup control apparatus for use with an automotive vehicle having an automatic transmission operable with a working fluid. The automatic transmission is coupled to an engine through a torque converter operable in a lockup mode where a mechanical connection is completed between the engine and the automatic transmission in response to a lockup command signal. The apparatus comprises sensor means sensitive to a speed of travelling of the vehicle for producing a sensor signal indicative of a sensed vehicle speed, lockup command production means for producing the lockup command signal when the sensed vehicle speed exceeds a reference value, degraded working fluid detection means for monitoring the torque converter operating in response to the lockup command signal to detect a degree to which the working fluid is degraded, control signal production means for producing a control signal when the detected degree exceeds a predetermined value, and control means responsive to the control signal for increasing the reference vehicle speed value.

In another aspect of the invention, the lockup control apparatus comprises sensor means sensitive to a speed of travelling of the vehicle for producing a sensor signal indicative of a sensed vehicle speed, means for controlling the automatic transmission to make a gear position change in the automatic transmission when the sensed vehicle speed exceeds a first reference value, lockup command production means for producing the lockup command signal when the sensed vehicle speed exceeds a second reference value, degraded working fluid detection means for monitoring the torque converter opera ting in response to the lockup command signal to detect a degree to which the working fluid is degraded, control signal production means for producing a control signal when the detected degree exceeds a predetermined value, and control means responsive to the control signal for increasing the first reference vehicle speed value.

In another aspect of the invention, the lockup control apparatus comprises sensor means sensitive to a speed of travelling of the vehicle for producing a sensor signal indicative of a sensed vehicle speed, lockup command production means for producing the lockup command signal when the sensed vehicle speed exceeds a reference value, means responsive to the lockup command signal for measuring a time required for the torque converter to change its operation to the lockup mode, means for counting the number of times that the measured time exceeds a first predetermined value, and control means for increasing the reference vehicle speed value based on the counted number.

In another aspect of the invention, the lockup control apparatus comprises sensor means sensitive to a speed of travelling of the vehicle for producing a sensor signal indicative of a sensed vehicle speed, lockup command production means for producing the lockup command signal when the sensed vehicle speed exceeds a reference value, means responsive to the lockup command signal for measuring a time during which a great degree of slippage occurs in the torque converter, means for counting the number of times that the measured time exceeds a first predetermined value, control means for increasing the reference vehicle speed value based on the counted number.

In another aspect of the invention, the lockup control apparatus comprises sensor means sensitive to a speed of travelling of the vehicle for producing a sensor signal indicative of a sensed vehicle speed, means for con trolling the automatic transmission to make a gear position change in the automatic transmission when the sensed vehicle speed exceeds a first reference value, lockup command production means for producing the lockup command signal when the sensed vehicle speed exceeds a second reference value, means responsive to the lockup command signal for measuring a time required for the torque converter to change its operation to the lockup mode, means for counting the number of times that the measured time exceeds a first predetermined value, and control means for increasing the reference vehicle speed value based on the counted number.

In another aspect of the invention, the lockup control apparatus comprises sensor means sensitive to a speed of travelling of the vehicle for producing a sensor signal indicative of a sensed vehicle speed, means for controlling the automatic transmission to make a gear position change in the automatic transmission when the sensed vehicle speed exceeds a first reference value, lockup command production means for producing the lockup command signal when the sensed vehicle speed exceeds a second reference value, means responsive to the lockup command signal for measuring a time during which a great degree of slippage occurs in the torque converter, means for counting the number of times that the measured time exceeds a first predetermined value, and control means for increasing the reference vehicle speed value based on the counted number.

In still another aspect of the invention, there is provided a method for controlling an automotive vehicle having an automatic transmission operable with a working fluid. The automatic transmission is coupled to an engine through a torque converter operable in a lockup mode where a mechanical connection is completed between the engine and the automatic transmission in response to a lockup command signal. The method comprises the steps of sensing a speed of travelling of the vehicle, producing the lockup command signal when the sensed vehicle speed exceeds a reference value, monitoring the torque converter opera ting in response to the lockup command signal to detect a degree to which the working fluid is degraded, producing a control signal when the detected degree exceeds a predetermined value, and increasing the reference vehicle speed value in the presence of the control signal.

In another aspect of the invention, the method comprises the steps of sensing a speed of travelling of the vehicle, controlling the automatic transmission to make a gear position change in the automatic transmission when the sensed vehicle speed exceeds a first reference value, producing the lockup command signal when the sensed vehicle speed exceeds a second reference value, monitoring the torque converter operating in response to the lockup command signal to detect a degree to which the working fluid is degraded, producing a control signal when the detected degree exceeds a predetermined value, and increasing the first reference vehicle speed value in the presence of the control signal.

In another aspect of the invention, the method comprises the steps of sensing a speed of travelling of the vehicle, producing the lockup command signal when the sensed vehicle speed exceeds a reference value, measuring a time required for the torque converter to change its operation to the lockup mode in the presence of the lockup command signal, counting the number of times that the measured time exceeds a first predetermined value, and increasing the reference vehicle speed value based on the counted number.

In another aspect of the invention, the method comprises the steps of sensing a speed of travelling of the vehicle, producing the lockup command signal when the sensed vehicle speed exceeds a reference value, measuring a time during which a great degree of slippage occurs in the torque converter operating in the presence of the lockup command signal, counting the number of times that the measured time exceeds a first predetermined value, and increasing the reference vehicle speed value based on the counted number.

In another aspect of the invention, the method comprises the steps of sensing a speed of travelling of the vehicle, controlling the automatic transmission to make a gear position change in the automatic transmission when the sensed vehicle speed exceeds a first reference value, producing the lockup command signal when the sensed vehicle speed exceeds a second reference value, measuring a time required for the torque converter to change its operation to the lockup mode in the presence of the lockup command signal, counting the number of times that the measured time exceeds a first predetermined value, and increasing the reference vehicle speed value based on the counted number.

In another aspect of the invention, the method comprises the steps of sensing a speed of travelling of the vehicle for producing a sensor signal indicative of a sensed vehicle speed, controlling the automatic transmission to make a gear position change in the automatic transmission when the sensed vehicle speed exceeds a first reference value, producing the lockup command signal when the sensed vehicle speed exceeds a second reference value, measuring a time during which a great degree of slippage occurs in the torque converter opera ting in the presence of the lockup command signal, counting the number of times that the measured time exceeds a first predetermined value, and increasing the reference vehicle speed value based on the counted number.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
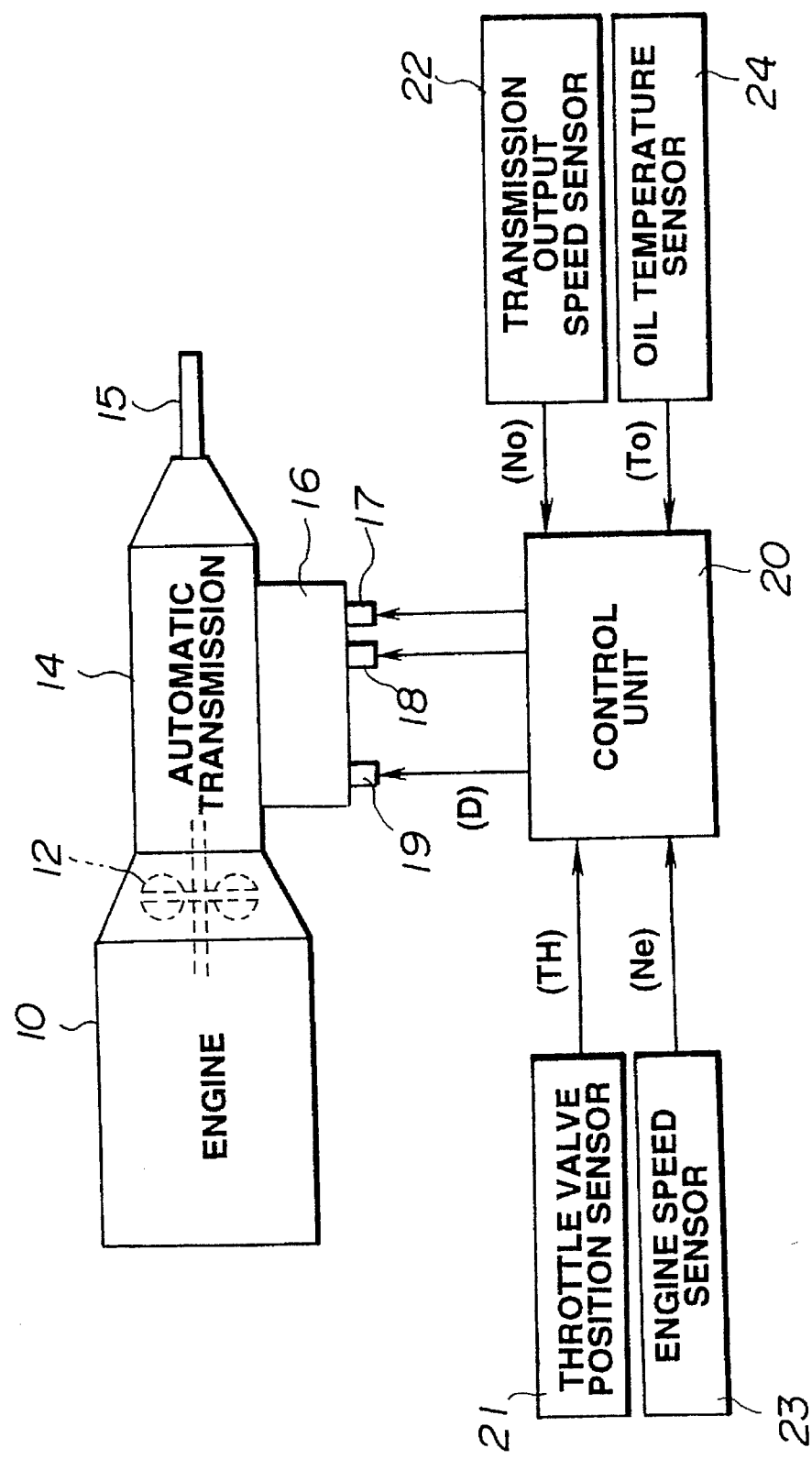
FIG. 1 is a schematic diagram showing one embodiment of a lockup control apparatus made in accordance with the invention.

With reference to the drawings, and in particular to FIG. 1, there is shown a schematic diagram of a lockup control apparatus embodying the method and apparatus of the invention. The lockup control apparatus is used with a torque converter 12 through which an internal combustion engine 10 is drivingly connected to an automatic transmission 14. The torque converter 12 has an impeller (input member) drivingly coupled to the engine 10 and a turbine (output member) drivingly coupled to the automatic transmission 14. The numeral 16 designates a control valve unit 16 which has shift solenoid-operated valves 17 and 18 used for gear shift control made in the automatic transmission 14 and also a lockup solenoid-opera ted valve 19 used for lockup control made in the torque converter 12. The shift solenoid-operated valves 17 and 18 responds to the duty factors of electric pulse signals applied thereto from a control unit 20 by selecting a gear ratio at which the automatic transmission 14 transmits a drive from the engine 10 to its output shaft 15. The lockup solenoid-operated valve 19 responds to the duty factor (D) of an electric pulse signal fed thereto from the control unit 20 by changing the mode of operation of the lockup clutch of the torque converter 12. The lockup clutch operates in a lockup mode completing a mechanical connection between the input and output members of the torque converter 12, for example, when the duty factor (D) is 95% and in a converter or released mode to provide a hydrodymanic driving connection between the input and output members of the torque converter 12, for example, when the duty factor (D) is 5%. The lockup clutch can operate in a slip lockup mode to provide a mechanical connection with a controlled degree of slippage permitted between the input and output members of the torque converter 12.

The control unit 20 controls the duty factor (D) of the electric pulse signal to the lockup solenoid-operated valve 19 for lockup control made in the torque converter 12 and also controls the duty factors of the electric pulse signals to the shift solenoid-operated valves 17 and 18 for gear shift control made in the automatic transmission 14. These controls are made based upon various vehicle opera ting conditions including throttle valve position TH, transmission output shaft speed No, engine speed Ne and oil temperature To. Thus, a throttle valve position sensor 21, a transmission output speed sensor 22, an engine speed sensor 23 and an oil temperature sensor 24 are connected to the control unit 30. The throttle valve position sensor 21 produces an electrical signal indicative of the angle TH of rotation of the throttle valve situated within the engine intake passage for controlling the amount of air permitted to enter the engine. The throttle valve is connected by a mechanical linkage to an accelerator pedal (not shown). The degree to which the accelerator pedal is depressed controls the degree of rotation of the throttle valve. The transmission output speed sensor 22 is provided for producing an electrical signal indicative of the speed No of rotation of the output shaft 15 of the automatic transmission 14. The engine speed sensor 23 is provided for producing an electrical signal indicative of the speed Ne of rotation of the engine 10. The oil temperature sensor 24 is mounted for producing an electrical signal indicative of the temperature To of the working oil to be introduced into the automatic transmission 14.

The control unit 20 may employ a digital computer which includes a central processing unit (CPU), a random access memory (RAM), a read only memory (ROM), and an input/output control unit (I/O). The central processing unit communicates with the rest of the computer via data bus. The input/output control circuit includes an analog-to-digital converter which converts the analog signal received from the sensors in to digital form for application to the central processing unit. The read only memory contains the program for operating the central processing unit and further contains appropriate data in look-up tables used for gear-shift and lockup control. The look-up data may be obtained experimentally or derived empirically.

Figure 2:
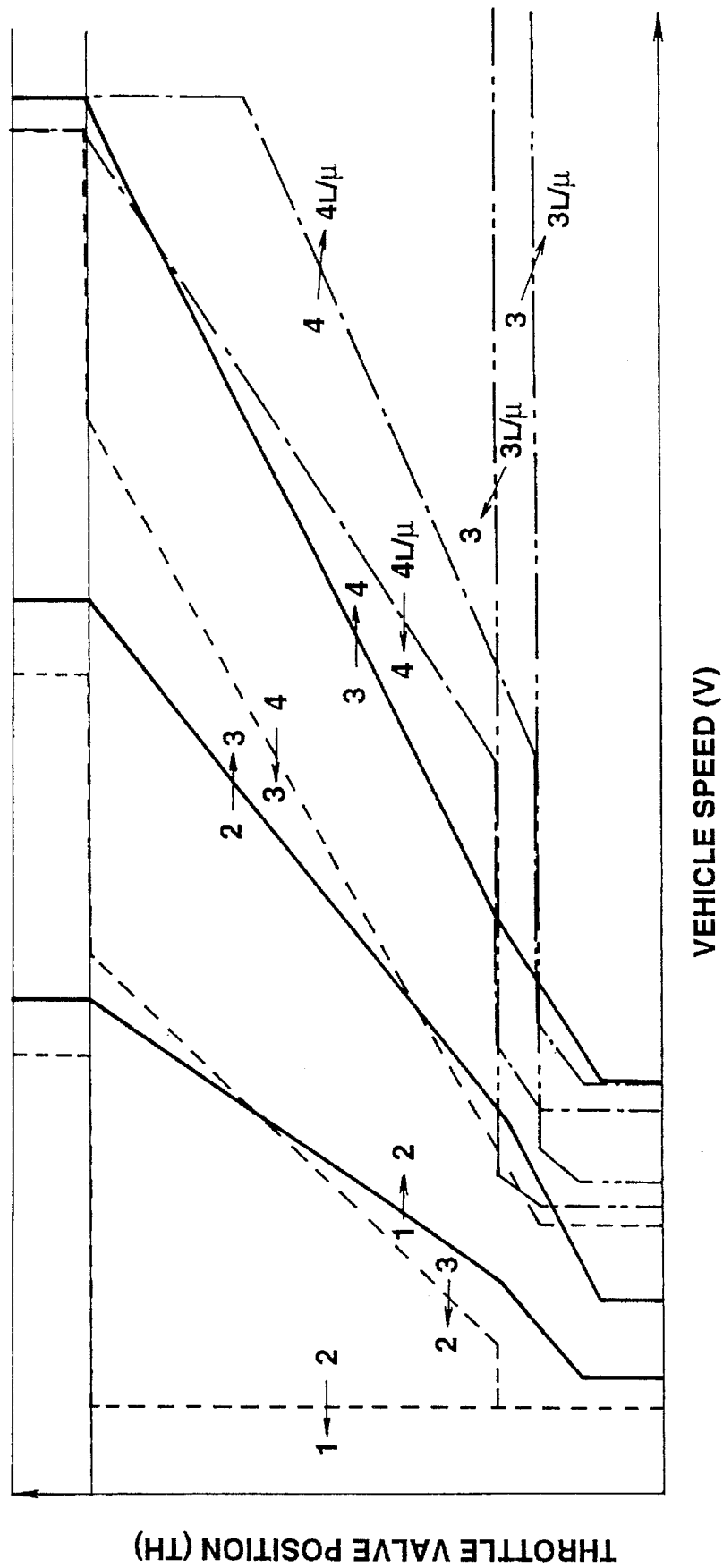
FIG. 2 is a graph of vehicle speed versus throttle angle.

The control unit 20 calculates the vehicle speed V as a function of transmission output speed No and it selects a desired gear position from a look-up table programmed into the computer. This look-up table is referred to as a gear shift control table which defines the desired gear position as a function of vehicle speed V and throttle valve position TH, as indicated by the solid and broken lines of FIG. 2. The control unit 20 controls the duty factors of the electric pulse signals applied to the respective shift solenoid-operated valves 17 and 18 so as to realize the desired gear position. The control units 20 determines whether the lockup or converter mode is desired. This determination is made from a look-up table programmed into the computer. This look-up table is referred to as a lockup control table which defines the desired mode as a function of vehicle speed V and throttle valve position TH, as indicated by the one- and two-dotted lines of FIG. 2. In FIG. 2, the character L/u is used to indicate a region where the lockup command is to be produced. The control unit 20 controls the duty ratio (D) of the electric pulse signal applied to the lockup solenoid-operated valve 19 to operate the torque converter 12 in the desired mode. For example, the torque converter 12 may be designed to operate in the lockup mode when the duty ratio of the electric pulse signal applied thereto is 959 and in the converter mode when the duty ratio is 5%.

Figure 3:
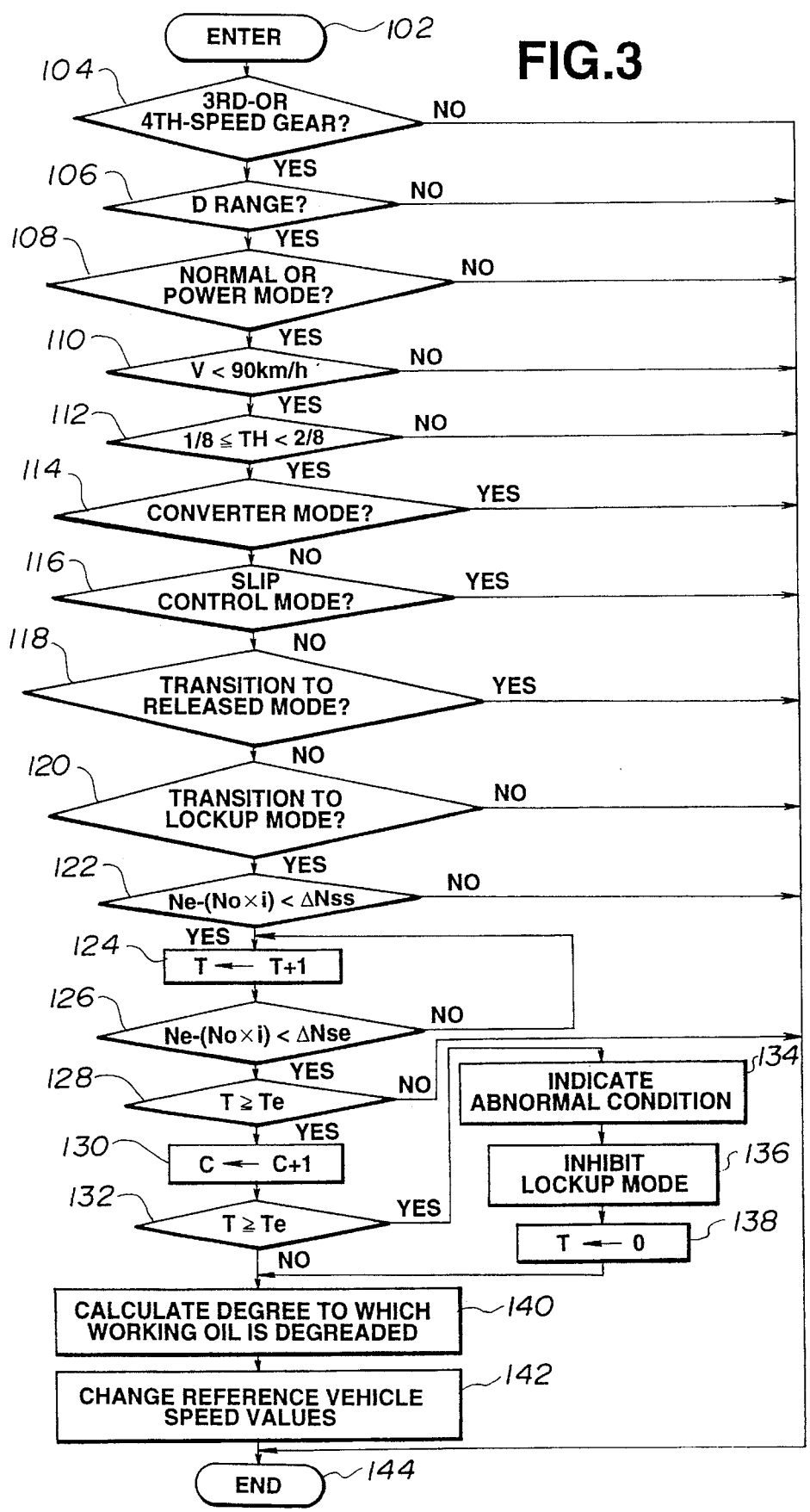
FIG. 3 is a flow diagram illustrating the programming of the digital computer.

FIG. 3 is a flow diagram illustrating the programming of the digital computer used in the control unit 20 of FIG. 1. The computer program is entered at the point 102 at uniform intervals of time. At the point 104 in the program, a determination is made as to whether or not the third- or fourth-speed gear is selected. If the answer to this question is "yes", then the program proceeds to the point 106. Otherwise, it means that the first- or second-speed gear is selected and the program proceeds to the end point 144. At the point 106 in the program, a determination is made as to whether or not the D range is selected. If the answer to this question is "yes", then the program proceeds to the point 108. Otherwise, the program proceeds to the end point 144. At the point 108 in the program, a determination is made as to whether or not the normal or power mode is selected. If the answer to this question is "yes", then the program proceeds to the point 110. Otherwise, it means that the snow or hold mode is selected and the program proceeds to the end point 144.

At the point 110 in the program, a determination is made as to whether or not the vehicle speed V is less than a predetermined value (for example, 90 Km/h). If the answer to this question is "yes", then the program proceeds to the point 112. Otherwise, the program proceeds to the end point 144. At the point 112 in the program, a determination is made as to whether or not the throttle valve position is in the range of ⅛ to ⅔. If the answer to this question is "yes", then the program proceeds to the point 114. Otherwise, the program proceeds to the end point 144. When the vehicle speed V is less than the predetermined value (for example, 90 Km/h) and the throttle valve position TH is in the range of ⅛ to ⅔, the engine is operating at a low speed causing the oil pump to discharge a small amount of oil.

At the point 114 in the program, a determination is made as to whether or not the torque converter 12 is operating in the converter mode. This determination is made based on throttle valve position TH and vehicle speed V with the use of the lockup control table as indicated by the one- and two-dotted lines of FIG. 2. If the answer to this question is "yes", then the program proceeds to the end point 144. Otherwise, the program proceeds to another determination step at the point 116. This determination is as to whether or not the torque converter 12 is opera ting in the slip control mode where a mechanical connection is provided with a controlled degree of slip permitted between the input and output members of the torque converter 12. If the answer to this question is "yes", then the program proceeds to the end point 144. Otherwise, the program proceeds to another determination step at the point 118. This determination is as to whether or not a transition occurs in the torque converter 12 toward its released mode where a hydrodynamic driving connection exists between the input and output members of the torque converter 12, that is, as to whether or not the lockup clutch is moving toward its opened, unlocked, released or disengaged position. If the answer to this question is "yes", then the program proceeds to the end point 144. Otherwise, the program proceeds to another determination step at the point 120. This determination is as to whether or not a transition occurs in the torque converter 12 toward its lockup mode where a mechanical connection is completed between the input and output members of the torque converter 12, that is, as to whether or not the lockup clutch is moving toward its closed, locked, applied or engaged position in the presence of a lockup command fed from the control unit 20. The lockup command is indicated when the duty factor D of the electric pulse signal applied to the lockup solenoid-operated valve 19 is 95%. If the answer to this question is "yes", then the program proceeds to the point 122. Otherwise, the program proceeds to the end point 144.

At the point 122 in the program, a determination is made as to whether or no t the torque converter slippage is less than a first predetermined value $\Delta N_{ss}$ (for example, 400 rpm). The torque converter slippage is a difference $Ne-(No \times i)$ between the input and output speeds of the torque converter 12 and may be calculated as a difference $Ne-(No \times i)$ of the transmission input speed $(No \times i)$ from the engine speed (torque converter input speed) Ne. The transmission input speed (No×i) is calculated by multiplying the transmission output speed No by the gear ratio i corresponding to the selected gear position. It is to be understood, of course, that the torque converter output speed may be measured directly with the use of an appropriate rotation sensor. If the answer to this question is "yes", then the program proceeds to the point 124. Otherwise, the program proceeds to the end point 144. At the point 124 in the program, a timer counter is advanced. Following this, the program proceeds to the point 126 where a determination is made as to whether or not the torque converter slippage Ne−(No× i) is less than a second predetermined value ΔNse (for example, 80 rpm) smaller than the first predetermined value ΔNss. If the answer to this question is "yes", then the program proceeds to the point 128. Otherwise, the program is returned to the point 124. Thus, the count T of the timer counter indicates the time during which the torque converter slippage is in the range of first and second predetermined value ΔNss and ΔNse and it corresponds to the lockup time required to change the operation of the torque converter 12 from the converter mode to the lockup mode.

At the point 128 in the program, a determination is made as to whether or not the lockup time T is equal to or greater than a predetermined value Ts (for example, 3 seconds). If the answer to this question is "yes", then the program proceeds to the point 130 where the count C of a counter is incremented. This count C is stored in an appropriate memory which can retain it after the power switch is turned off. Otherwise, it means that the working oil is not degraded to an extent exceeding the allowed limit and the program proceeds to the end point 144. At the point 132 in the program, a determination is made as to whether or not the lockup time T is equal to or greater than a predetermined value Te (for example, 10 seconds) greater than the first predetermined value Ts. If the answer to this question is "yes", then it means that an excessive degree of slippage occurs in the torque converter 12 10 and the program proceeds to the point 134 where an indication of an abnormal lockup condition is produced. In this event, the program proceeds to the point 136 where the lockup mode is inhibited and to the point 138 where the timer is reset to initialize the count T to zero. Following this, the program proceeds to the point 140.

Figures 4, 5A, 5B:
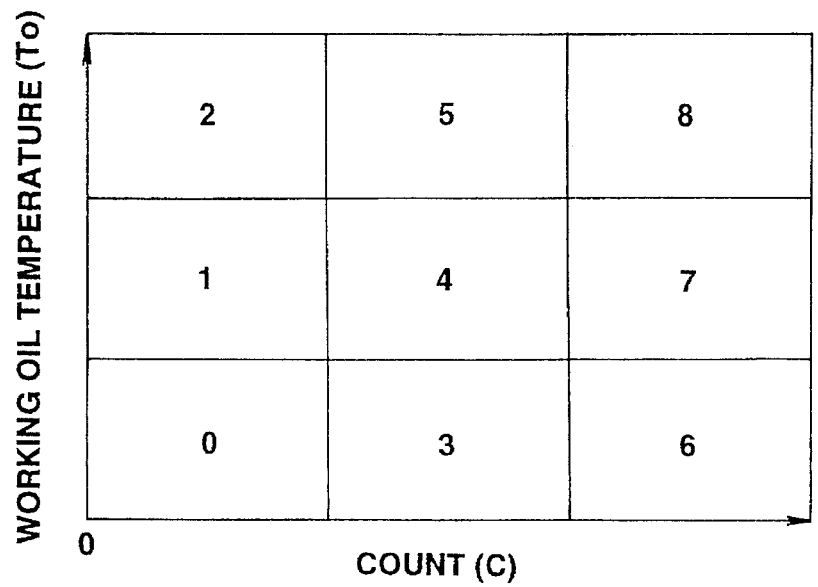
FIG. 4 is a diagram showing a lock-up table programmed for use in determining the degree to which the working oil.
FIG. 5A is a diagram used in explaining selection of one of two look-up tables programmed for gear changing control.
FIG. 5B is a diagram used in explaining selection of one of two look-up tables programmed for lockup control.

If the answer to the question inputted at the point 132 is "no", then the program proceeds to the point 140 where the degree to which the working oil to be introduced into the automatic transmission is degraded is calculated based on the working oil temperature To and the count C accumulated at the point 130. This calculation is made by selecting one of predetermined factors 0–1, as shown in FIG. 4. The greater the selected factor, the greater the degree to which the working oil is degraded. At the point 142 in the program, one of first and second gear shift control tables used for gear shift control is selected according to the factor selected at the point 140, as shown in FIG. 5A, and one of first and second lockup control tables used for lockup control is selected according to the factor selected at the point 140, as shown in FIG. 5B. The first gear shift control table Tg1 may be the gear shift control table as indicated by the solid and broken lines of FIG. 2. The second gear shift control table Tg2 has gear shift control lines shifted from the positions indicated by the solid and broken lines of FIG. 2 to the right or toward the greater vehicle speed side. The extent to which the gear shift control lines are shifted toward the greater vehicle speed side increases as the selected factor increases. Thus, the vehicle speed V at which a gear changing operation is made is greater for the second gear shift control table Tg2 than for the first gear shift control table Tg1. Assuming now that the third-speed gear is selected in the D range, the second gear shift control table Tg2 is used for gear shift control except for the case where the selected factor is 0. The first lockup control table Tl1 may be the lockup control table as indicated by the one- and two-dotted lines of FIG. 2. The second lockup control table Tl2 has lockup control lines shifted from the positions indicated by the one- and two-dotted lines of FIG. 2 to the right or toward the greater vehicle speed side. The extent to which the lockup control lines are shifted toward the greater vehicle speed side increases as the selected factor increases. Thus, the vehicle speed V at which a lockup command is produced is greater for the second lockup control table Tl2 than for the first lockup control table Tl1. Assuming now that the third-or fourth-speed gear is selected in the D range, the second lockup control table Tl2 is used for lockup control except for the case where the selected factor is 0. Following this, the program proceed to the end point 144.

The degree to which the working oil (fluid) is degraded is detected according to the time required to realize the lockup mode of operation the torque converter 12 in response to a lockup command signal. When the working oil is degraded, a great degree of slippage will occur to cause wear of the lockup clutch and poor fuel economy particularly at low vehicle speed operation. In this embodiment, it is possible to prevent such slippage by increasing the reference vehicle speed value at which the lockup command signal is produced. This is effective to provide less wear of the lockup clutch and improve fuel economy.

When the working oil is degraded, a change will be produced from a higher gear to a lower one for the same operating conditions so that the lockup command signal is produced at a higher engine speed. As a result, a great degree of slippage will occur to cause wear of the lockup clutch and poor fuel economy particularly at low vehicle speed operation. In this embodiment, it is possible to prevent such slippage by increasing the reference vehicle speed value at which a gear position change is made in the automatic transmission. This is effective to provide less wear of the lockup clutch and improve fuel economy.

Figure 6:
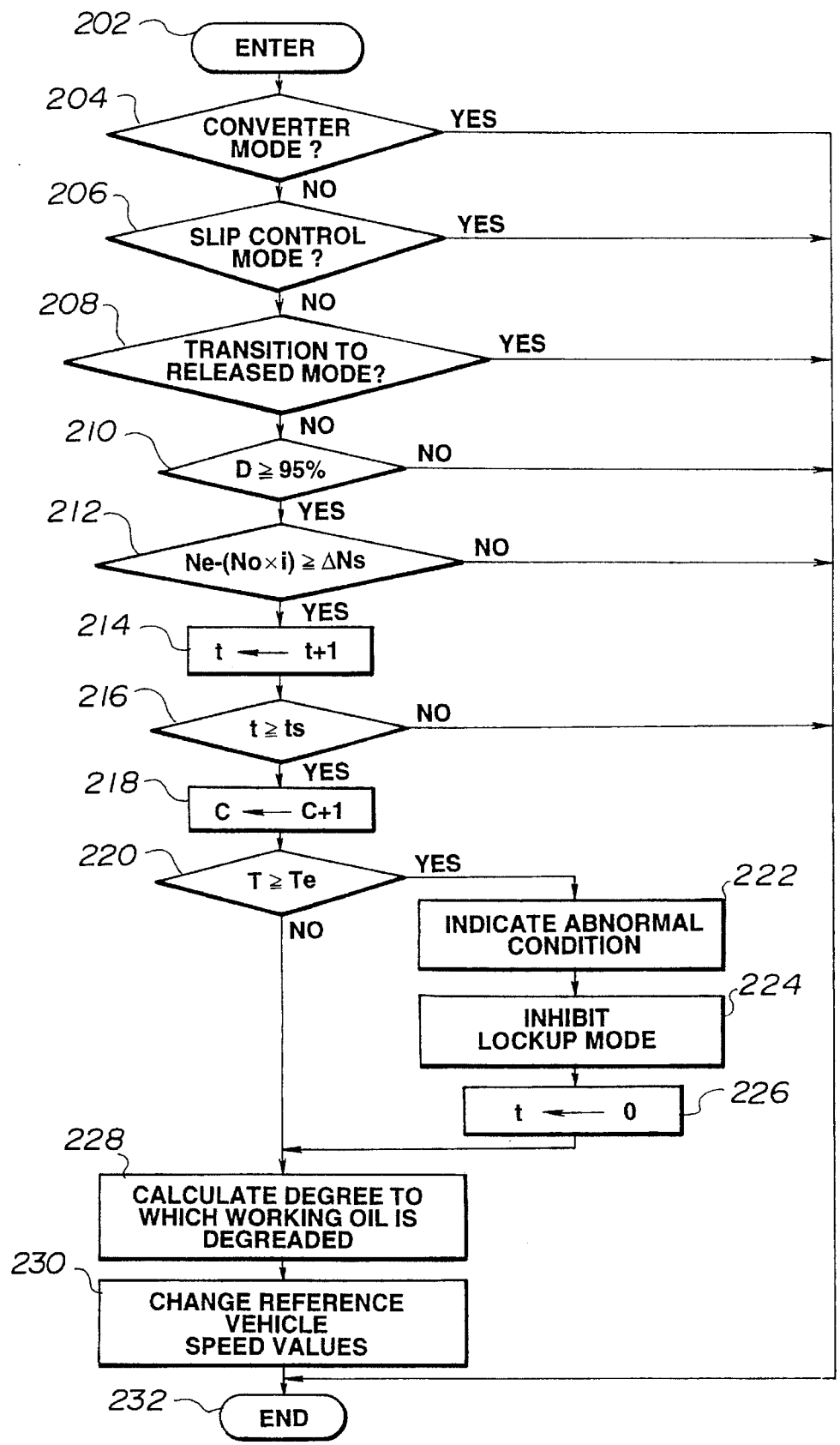
FIG. 6 is a flow diagram illustrating a modified form of the programming of the digital computer.

FIG. 6 is a flow diagram illustrating a modified form of the programming of the digital computer used in the control unit 20 of FIG. 1. The computer program is entered at the point 202 at uniform intervals of time. At the point 204 in the program, a determination is made as to whether or not the torque converter 12 is operating in the converter mode. This determination is made based on throttle valve position TH and vehicle speed V with the use of the lockup control table as indicated by the one- and two-dotted lines of FIG. 2. If the answer to this question is "yes", then the program proceeds to the end point 232. Otherwise, the program proceeds to another determination step at the point 206. This determination is as to whether or not the torque converter 12 is operating in the slip control mode where a mechanical connection is provided with a controlled degree of slip permitted between the input and output members of the torque converter 12. If the answer to this question is "yes", then the program proceeds to the end point 232. Otherwise, the program proceeds to another determination step at the point 208. This determination is as to whether or not a transition occurs in the torque converter 12 toward its released mode where a hydrodynamic driving connection exists between the input and output members of the torque converter 12, that is, as to whether or not the lockup clutch is moving toward its opened, unlocked, released or disengaged position. If the answer to this question is "yes", then the program proceeds to the end point 232. Otherwise, it means that the lockup clutch is in a steady lockup mode and the program proceeds to another determination step at the point 210. This determination is as to whether or not the duty ratio D of the electric pulse signal applied to the lockup solenoid-operated valve 19 from the control unit 20 is equal to or greater than 95%. If the answer to this question is "yes", then it means an intention to steadily retain the torque converter 12 in the lockup mode and the program proceeds to the point 212. Otherwise, the program proceeds to the end point 232.

At the point 212 in the program, a determination is made as to whether or not the torque converter slippage is less than a predetermined value $\Delta Ns$. The torque converter slippage is a difference $Ne-(No \times i)$ between the input and output speeds of the torque converter 12 and may be calculated as a difference $Ne-(No \times i)$ of the transmission input speed $(No \times i)$ from the engine speed (torque converter input speed) Ne. The transmission input speed $(No \times 1)$ is calculated by multiplying the transmission output speed No by the gear ratio i corresponding to the selected gear position. It is to be understood, of course, that the torque converter output speed may be measured directly with the use of an appropriate rotation sensor. The predetermined slippage value aNs is a minimum value which cannot be realized in a complete lockup mode of operation of the torque converter 12. It is preferable to perform an appropriate slippage detection by setting the predetermined slippage value $\Delta Ns$ as a function of vehicle speed V. For example, the predetermined slippage value $\Delta Ns$ may be set as $\Delta Ns = v/2 + 20$ rpm. If the answer to this question is "yes", then the program proceeds to the point 216. Otherwise, the program proceeds to the end point 232.

At the point 214 in the program, a timer counter is advanced. Thus, the count t of the timer counter indicates the time during which a great degree of slippage remains in spite of the lockup mode of operation of the torque converter 12. At the point 216 in the program, a determination is made as to whether or not the continuous slippage time t is equal to or greater than a first predetermined value is (for example, 1 seconds). If the answer to this question is "yes", then the program proceeds to the point 218 where the count c of a counter is incremented. This count c is stored in an appropriate memory which can retain it after the power switch is turned off. Otherwise, the program proceeds to the end point 232. At the point 220 in the program, a determination is made as to whether or not the continuous slippage time t is equal to or greater than a second predetermined value te (for example, 10 seconds) greater than the first predetermined value ts. If the answer to this question is "yes", then it means that an excessive degree of slippage occurs in the torque converter 12 and the program proceeds to the point 222 where an indication of an abnormal lockup condition is produced. In this event, the program proceeds to the point 224 where the lockup mode is inhibited and to the point 226 where the timer is reset to initialize the count t to zero. Following this, the program proceeds to the point 228.

If the answer to the question inputted at the point 220 is "no", then the program proceeds to the point 228 where the degree to which the working oil to be introduced into the automatic transmission 14 is degraded is calculated based on the working oil temperature To and the count c accumulated at the point 218. This calculation is made by selecting one of predetermined factors 0–1, as shown in FIG. 4. The greater the selected factor, the greater the degree to which the working oil is degraded. At the point 230 in the program, one of first and second gear shift control tables used for gear shift control is selected according to the factor selected at the point 228, as shown in FIG. 5A, and one of first and second lockup control tables used for lockup control is selected according to the factor selected at the point 228, as shown in FIG. 5B. The first gear shift control table Tg1 may be the gear shift control table as indicated by the solid and broken lines of FIG. 2. The second gear shift control table Tg2 has gear shift control lines shifted from the positions indicated by the solid and broken lines of FIG. 2 to the right or toward the greater vehicle speed side. The extent to which the gear shift control lines are shifted toward the greater vehicle speed side increases as the selected factor increases. Thus, the vehicle speed V at which a gear changing operation is made is greater for the second gear shift control table Tg2 than for the first gear shift control table Tg1. Assuming now that the third-speed gear is selected in the D range, the second gear shift control table Tg2 is used for gear shift control except for the case where the selected factor is 0. The first lockup control table Tl1 may be the lockup control table as indicated by the one- and two-dotted lines of FIG. 2. The second lockup control table Tl2 has lockup control lines shifted from the positions indicated by the one- and two-dotted lines of FIG. 2 to the right or toward the greater vehicle speed side. The extent to which the lockup control lines are shifted toward the greater vehicle speed side increases as the selected factor increases. Thus, the vehicle speed V at which a lockup command is produced is greater for the second lockup control table Tl2 than for the first lockup control table Tl1. Assuming now that the third-or fourth-speed gear is selected in the D range, the second lockup control table Tl2 is used for lockup control except for the case where the selected factor is 0. Following this, the program proceed to the end point 232.

In this modification, the degree to which the working oil is degraded is detected according to the time during which a great degree of slippage occurs in the torque converter in the presence of a lockup command signal. When the working oil is degraded, a great degree of slippage will occur to cause wear of the lockup clutch and poor fuel economy particularly at low vehicle speed operation. It is possible to prevent such slippage by increasing the reference vehicle speed value at which the lockup command signal is produced. This is effective to provide less wear of the lockup clutch and improve fuel economy.

When the working oil is degraded, a change will be produced from a higher gear to a lower one for the same operating conditions so that the lockup command signal is produced at a higher engine speed. As a result, a great degree of slippage will occur to cause wear of the lockup clutch and poor fuel economy particularly at low vehicle speed operation. In this embodiment, it is possible to prevent such slippage by increasing the reference vehicle speed value at which a gear position change is made in the automatic transmission. This is effective to provide less wear of the lockup clutch and improve fuel economy.

What is claimed is:

1. A lockup control apparatus for use with an automotive vehicle having an automatic transmission operable with a working fluid, the automatic transmission being coupled to an engine through a torque converter operable in a lockup mode where a mechanical connection is completed between the engine and the automatic transmission in response to a lockup command signal, the apparatus comprising:

sensor means sensitive to a speed of travelling of the vehicle for producing a sensor signal indicative of a sensed vehicle speed;

lockup command production means for producing the lockup command signal when the sensed vehicle speed exceeds a reference value;

degraded working fluid detection means for monitoring the torque converter operating in response to the lockup command signal to detect a degree to which the working fluid is degraded;

control signal production means for producing a control signal when the detected degree exceeds a predetermined value; and control means responsive to the control signal for increasing the reference vehicle speed value.

2. The lockup control apparatus as claimed in claim 1, wherein the degraded working fluid detection means includes means responsive to the lockup command signal for measuring a time required for the torque converter to change its operation to the lockup mode, and wherein the control signal production means includes means for producing the control signal when the measured time exceeds a first predetermined value.

3. The lockup control apparatus as claimed in claim 2, further including means for producing an alarm to indicate an abnormal condition when the measured time exceeds a second predetermined value greater than the first predetermined value.

4. The lockup control apparatus as claimed in claim 1, wherein the degraded working fluid detection means includes means responsive to the lockup command signal for measuring a time during which at least a predetermined amount of slippage occurs in the torque converter, and wherein the control signal production means includes means for producing the control signal when the measured time exceeds a first predetermined value.

5. The lockup control apparatus as claimed in claim 4, further including means for producing an alarm to indicate an abnormal condition when the measured time exceeds a second predetermined value greater than the first predetermined value.

6. A lockup control apparatus for use with an automotive vehicle having an automatic transmission operable with a working fluid, the automatic transmission being coupled to an engine through a torque converter operable in a lockup mode where a mechanical connection is completed between the engine and the automatic transmission in response to a lockup command signal, the apparatus comprising:

sensor means sensitive to a speed of travelling of the vehicle for producing a sensor signal indicative of a sensed vehicle speed;

means for controlling the automatic transmission to make a gear position change in the automatic transmission when the sensed vehicle speed exceeds a first reference value;

lockup command production means for producing the lockup command signal when the sensed vehicle speed exceeds a second reference value;

degraded working fluid detection means for monitoring the torque converter operating in response to the lockup command signal to detect a degree to which the working fluid is degraded;

control signal production means for producing a control signal when the detected degree exceeds a predetermined value; and control means responsive to the control signal for increasing the first reference vehicle speed value.

7. The lockup control apparatus as claimed in claim 6, wherein the degraded working fluid detection means includes means responsive to the lockup command signal for measuring a time required for the torque converter to change its operation to the lockup mode, and wherein the control signal production means includes means for producing the control signal when the measured time exceeds a first predetermined value.

8. The lockup control apparatus as claimed in claim 7, further including means for producing an alarm to indicate an abnormal condition when the measured time exceeds a second predetermined value greater than the first predetermined value.

9. The lockup control apparatus as claimed in claim 6, wherein the degraded working fluid detection means includes means responsive to the lockup command signal for measuring a time during which at least a predetermined amount of slippage occurs in the torque converter, and wherein the control signal production means includes means for producing the control signal when the measured time exceeds a first predetermined value.

10. The lockup control apparatus as claimed in claim 9, further including means for producing an alarm to indicate an abnormal condition when the measured time exceeds a second predetermined value greater than the first predetermined value.

11. The lockup control apparatus as claimed in claim 6, further including means responsive to the control signal for increasing the second reference vehicle speed value.

12. The lockup control apparatus as claimed in claim 11, wherein the degraded working fluid detection means includes means responsive to the lockup command signal for measuring a time required for the torque converter to change its operation to the lockup mode, and wherein the control signal production means includes means for producing the control signal when the measured time exceeds a first predetermined value.

13. The lockup control apparatus as claimed in claim 12, further including means for producing an alarm to indicate an abnormal condition when the measured time exceeds a second predetermined value greater than the first predetermined value.

14. The lockup control apparatus as claimed in claim 11, wherein the degraded working fluid detection means includes means responsive to the lockup command signal for measuring a time during which at least a predetermined amount of slippage occurs in the torque converter, and wherein the control signal production means includes means for producing the control signal when the measured time exceeds a first predetermined value.

15. The lockup control apparatus as claimed in claim 14, further including means for producing an alarm to indicate an abnormal condition when the measured time exceeds a second predetermined value greater than the first predetermined value.

16. A lockup control apparatus for use with an automotive vehicle having an automatic transmission operable with a working fluid, the automatic transmission being coupled to an engine through a torque converter operable in a lockup mode where a mechanical connection is completed between the engine and the automatic transmission in response to a lockup command signal, the apparatus comprising:

sensor means sensitive to a speed of travelling of the vehicle for producing a sensor signal indicative of a sensed vehicle speed;

lockup command production means for producing the lockup command signal when the sensed vehicle speed exceeds a reference value;

means responsive to the lockup command signal for measuring a time required for the torque converter to change its operation to the lockup mode;

means for counting the number of times that the measured time exceeds a first predetermined value; and control means for increasing the reference vehicle speed value based on the counted number.

17. The lockup control apparatus as claimed in claim 16, further including means for producing an alarm to indicate an abnormal condition when the measured time exceeds a second predetermined value greater than the first predetermined value.

18. A lockup control apparatus for use with an automotive vehicle having an automatic transmission operable with a working fluid, the automatic transmission being coupled to an engine through a torque converter operable in a lockup mode where a mechanical connection is completed between the engine and the automatic transmission in response to a lockup command signal, the apparatus comprising:

sensor means sensitive to a speed of travelling of the vehicle for producing a sensor signal indicative of a sensed vehicle speed;

lockup command production means for producing the lockup command signal when the sensed vehicle speed exceeds a reference value;

means responsive to the lockup command signal for measuring a time during which at least a predetermined amount of slippage occurs in the torque converter;

means for counting the number of times that the measured time exceeds a first predetermined value; and control means for increasing the reference vehicle speed value based on the counted number.

19. The lockup control apparatus as claimed in claim 18, further including means for producing an alarm to indicate an abnormal condition when the measured time exceeds a second predetermined value greater than the first predetermined value.

20. A lockup control apparatus for use with an automotive vehicle having an automatic transmission operable with a working fluid, the automatic transmission being coupled to an engine through a torque converter operable in a lockup mode where a mechanical connection is completed between the engine and the automatic transmission in response to a lockup command signal, the apparatus comprising:

sensor means sensitive to a speed of travelling of the vehicle for producing a sensor signal indicative of a sensed vehicle speed;

means for controlling the automatic transmission to make a gear position change in the automatic transmission when the sensed vehicle speed exceeds a first reference value;

lockup command production means for producing the lockup command signal when the sensed vehicle speed exceeds a second reference value;

means responsive to the lockup command signal for measuring a time required for the torque converter to change its operation to the lockup mode;

means for counting the number of times that the measured time exceeds a first predetermined value; and control means for increasing the first reference vehicle speed value based on the counted number.

21. The lockup control apparatus as claimed in claim 20, further including means for producing an alarm to indicate an abnormal condition when the measured time exceeds a second predetermined value greater than the first predetermined value.

22. The lockup control apparatus as claimed in claim 20, further including means for increasing the second reference vehicle speed value based on the counted number.

23. The lockup control apparatus as claimed in claim 22, further including means for producing an alarm to indicate an abnormal condition when the measured time exceeds a second predetermined value greater than the first predetermined value.

24. A lockup control apparatus for use with an automotive vehicle having an automatic transmission operable with a working fluid, the automatic transmission being coupled to an engine through a torque converter operable in a lockup mode where a mechanical connection is completed between the engine and the automatic transmission in response to a lockup command signal, the apparatus comprising:

sensor means sensitive to a speed of travelling of the vehicle for producing a sensor signal indicative of a sensed vehicle speed;

means for controlling the automatic transmission to make a gear position change in the automatic transmission when the sensed vehicle speed exceeds a first reference value;

lockup command production means for producing the lockup command signal when the sensed vehicle speed exceeds a second reference value;

means responsive to the lockup command signal for measuring a time during which at least a predetermined amount of slippage occurs in the torque converter;

means for counting the number of times that the measured time exceeds a first predetermined value; and control means for increasing the first reference vehicle speed value based on the counted number.

25. The lockup control apparatus as claimed in claim 24, further including means for producing an alarm to indicate an abnormal condition when the measured time exceeds a second predetermined value greater than the first predetermined value.

26. The lockup control apparatus as claimed in claim 24, further including means for increasing the second reference vehicle speed value based on the counted number.

27. The lockup control apparatus as claimed in claim 26, further including means for producing an alarm to indicate an abnormal condition when the measured time exceeds a second predetermined value greater than the first predetermined value.

28. A method for controlling an automotive vehicle having an automatic transmission operable with a working fluid, the automatic transmission being coupled to an engine through a torque converter operable in a lockup mode where a mechanical connection is completed between the engine and the automatic transmission in response to a lockup command signal, comprising the steps of:

sensing a speed of travelling of the vehicle;

producing the lockup command signal when the sensed vehicle speed exceeds a reference value;

monitoring the torque converter operating in response to the lockup command signal to detect a degree to which the working fluid is degraded;

producing a control signal when the detected degree exceeds a predetermined value; and increasing the reference vehicle speed value in the presence of the control signal.

29. The method as claimed in claim 28, wherein the degree to which the working fluid is degraded is detected by measuring a time required for the torque converter to change its operation to the lockup mode in the presence of the lockup command signal, and wherein the control signal is produced when the measured time exceeds a first predetermined value.

30. The method as claimed in claim 29, further including the step of producing an alarm to indicate an abnormal condition when the measured time exceeds a second predetermined value greater than the first predetermined value.

31. The method as claimed in claim 28, wherein the degree to which the working fluid is degraded is detected by measuring a time during which at least a predetermined amount of slippage occurs in the torque converter operating in response to the lockup command signal, and wherein the control signal is produced when the measured time exceeds a first predetermined value.

32. The method as claimed in claim 31, further including the step of producing an alarm to indicate an abnormal condition when the measured time exceeds a second predetermined value greater than the first predetermined value.

33. A method for controlling an automotive vehicle having an automatic transmission operable with a working fluid, the automatic transmission being coupled to an engine through a torque converter operable in a lockup mode where a mechanical connection is completed between the engine and the automatic transmission in response to a lockup command signal, comprising the steps of:

sensing a speed of travelling of the vehicle;

controlling the automatic transmission to make a gear position change in the automatic transmission when the sensed vehicle speed exceeds a first reference value;

producing the lockup command signal when the sensed vehicle speed exceeds a second reference value;

monitoring the torque converter operating in response to the lockup command signal to detect a degree to which the working fluid is degraded;

producing a control signal when the detected degree exceeds a predetermined value; and increasing the first reference vehicle speed value in the presence of the control signal.

34. The method as claimed in claim 33, wherein the degree to which the working fluid is degraded is detected by measuring a time required for the torque converter to change its operation to the lockup mode in the presence of the lockup command signal, and wherein the control signal is produced when the measured time exceeds a first predetermined value.

35. The method as claimed in claim 34, further including the step of producing an alarm to indicate an abnormal condition when the measured time exceeds a second predetermined value greater than the first predetermined value.

36. The method as claimed in claim 33, wherein the degree to which the working fluid is degraded is detected by measuring a time during which at least a predetermined amount of slippage occurs in the torque converter operating in the presence of the lockup command signal, and wherein the control signal is produced when the measured time exceeds a first predetermined value.

37. The method as claimed in claim 36, further including the step of producing an alarm to indicate an abnormal condition when the measured time exceeds a second predetermined value greater than the first predetermined value.

38. The method as claimed in claim 33, further including the step of increasing the second reference vehicle speed value in the presence of the control signal.

39. The method as claimed in claim 38, wherein the degree to which the working fluid is degraded is detected by measuring a time required for the torque converter to change its operation to the lockup mode in the presence of the lockup command signal, and wherein the control signal is produced when the measured time exceeds a first predetermined value.

40. The method as claimed in claim 39, further including the step of producing an alarm to indicate an abnormal condition when the measured time exceeds a second predetermined value greater than the first predetermined value.

41. The method as claimed in claim 38, wherein the degree to which the working fluid is degraded is detected by measuring a time during which at least a predetermined amount of slippage occurs in the torque converter operating in the presence of the lockup command signal, and wherein the control signal is produced when the measured time exceeds a first predetermined value.

42. The method as claimed in claim 41, further including the step of producing an alarm to indicate an abnormal condition when the measured time exceeds a second predetermined value greater than the first predetermined value.

43. A method for controlling an automotive vehicle having an automatic transmission operable with a working fluid, the automatic transmission being coupled to an engine through a torque converter operable in a lockup mode where a mechanical connection is completed between the engine and the automatic transmission in response to a lockup command signal, comprising the steps of:

sensing a speed of travelling of the vehicle;

producing the lockup command signal when the sensed vehicle speed exceeds a reference value;

measuring a time required for the torque converter to change its operation to the lockup mode in the presence of the lockup command signal;

counting the number of times that the measured time exceeds a first predetermined value; and increasing the reference vehicle speed value based on the counted number.

44. The method as claimed in claim 43, further including the step of producing an alarm to indicate an abnormal condition when the measured time exceeds a second predetermined value greater than the first predetermined value.

45. A method for controlling an automotive vehicle having an automatic transmission operable with a working fluid, the automatic transmission being coupled to an engine through a torque converter operable in a lockup mode where a mechanical connection is completed between the engine and the automatic transmission in response to a lockup command signal, comprising the steps of:

sensing a speed of travelling of the vehicle;

producing the lockup command signal when the sensed vehicle speed exceeds a reference value;

measuring a time during which at least a predetermined amount of slippage occurs in the torque converter operating in the presence of the lockup command signal;

counting the number of times that the measured time exceeds a first predetermined value; and increasing the reference vehicle speed value based on the counted number.

46. The method as claimed in claim 45, further including the step of producing an alarm to indicate an abnormal condition when the measured time exceeds a second predetermined value greater than the first predetermined value.

47. A method for controlling an automotive vehicle having an automatic transmission operable with a working fluid, the automatic transmission being coupled to an engine through a torque converter operable in a lockup mode where a mechanical connection is completed between the engine and the automatic transmission in response to a lockup command signal, comprising the step of:

sensing a speed of travelling of the vehicle;

controlling the automatic transmission to make a gear position change in the automatic transmission when the sensed vehicle speed exceeds a first reference value;

producing the lockup command signal when the sensed vehicle speed exceeds a second reference value;

measuring a time required for the torque converter to change its operation to the lockup mode in the presence of the lockup command signal;

counting the number of times that the measured time exceeds a first predetermined value; and increasing the first reference vehicle speed value based on the counted number.

48. The method as claimed in claim 47, further including the step of producing an alarm to indicate an abnormal condition when the measured time exceeds a second predetermined value greater than the first predetermined value.

49. The method as claimed in claim 47, further including the step of increasing the second reference vehicle speed value based on the counted number.

50. The method as claimed in claim 49, further including the step of producing an alarm to indicate an abnormal condition when the measured time exceeds a second predetermined value greater than the first predetermined value.

51. A method for controlling an automotive vehicle having an automatic transmission operable with a working fluid, the automatic transmission being coupled to an engine through a torque converter operable in a lockup mode where a mechanical connection is completed between the engine and the automatic transmission in response to a lockup command signal, comprising the step of:

sensing a speed of travelling of the vehicle for producing a sensor signal indicative of a sensed vehicle speed;

controlling the automatic transmission to make a gear position change in the automatic transmission when the sensed vehicle speed exceeds a first reference value;

producing the lockup command signal when the sensed vehicle speed exceeds a second reference value;

measuring a time during which at least a predetermined amount of slippage occurs in the torque converter operating in the presence of the lockup command signal;

counting the number of times that the measured time exceeds a first predetermined value; and increasing the first reference vehicle speed value based on the counted number.

52. The method as claimed in claim 51, further including the step of producing an alarm to indicate an abnormal condition when the measured time exceeds a second predetermined value greater than the first predetermined value.

53. The method as claimed in claim 51, further including the step of increasing the second reference vehicle speed value based on the counted number.

54. The method as claimed in claim 53, further including the step of producing an alarm to indicate an abnormal condition when the measured time exceeds a second predetermined value greater than the first predetermined value.

* * * * *